United States Patent
Kuraki et al.

(10) Patent No.: US 8,532,433 B2
(45) Date of Patent: Sep. 10, 2013

(54) IMAGE MARKER ATTACHING APPARATUS AND METHOD

(75) Inventors: Kensuke Kuraki, Kawasaki (JP); Shohei Nakagata, Kawasaki (JP); Jun Takahashi, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 325 days.

(21) Appl. No.: 12/637,256

(22) Filed: Dec. 14, 2009

(65) Prior Publication Data

US 2010/0158383 A1 Jun. 24, 2010

(30) Foreign Application Priority Data

Dec. 18, 2008 (JP) ................................. 2008-322378

(51) Int. Cl.
 *G06K 9/46* (2006.01)
 *G06K 9/66* (2006.01)

(52) U.S. Cl.
 USPC ........ 382/287; 235/494; 235/462.08; 283/17; 283/73; 382/100; 382/103; 382/190; 382/321

(58) Field of Classification Search
 USPC ..................... 369/47.1, 275.3; 382/190, 100, 382/103, 287, 321; 399/389; 235/454, 462.08, 235/462.1, 494; 283/17, 73
 See application file for complete search history.

(56) References Cited

U.S. PATENT DOCUMENTS

| | | | |
|---|---|---|---|
| 5,726,435 A | 3/1998 | Hara et al. | |
| 5,825,947 A * | 10/1998 | Sasaki et al. | 382/321 |
| 6,131,807 A * | 10/2000 | Fukuda et al. | 235/494 |
| 6,408,106 B1 * | 6/2002 | Tatsuta et al. | 382/287 |
| 7,477,859 B2 * | 1/2009 | Sakata et al. | 399/82 |
| 7,802,730 B2 * | 9/2010 | Senda | 235/494 |
| 7,845,560 B2 * | 12/2010 | Emanuel et al. | 235/462.08 |
| 7,916,893 B2 * | 3/2011 | Kouno et al. | 382/103 |
| 8,079,582 B2 * | 12/2011 | Reichhart | 270/5.02 |
| 2004/0050931 A1 * | 3/2004 | Ono et al. | 235/380 |
| 2005/0281184 A1 * | 12/2005 | Sakata et al. | 369/275.3 |
| 2006/0289625 A1 * | 12/2006 | Tamune | 235/375 |
| 2007/0295814 A1 * | 12/2007 | Tanaka et al. | 235/454 |
| 2009/0008453 A1 * | 1/2009 | Ikeda | 235/462.1 |
| 2009/0023861 A1 | 1/2009 | Shimakage et al. | |
| 2009/0153675 A1 * | 6/2009 | Owashi | 348/207.99 |
| 2009/0238361 A1 | 9/2009 | Anan et al. | |
| 2009/0323950 A1 | 12/2009 | Nakagata et al. | |
| 2010/0078478 A1 * | 4/2010 | Ao et al. | 235/454 |

(Continued)

FOREIGN PATENT DOCUMENTS

| | | |
|---|---|---|
| EP | 0 672 994 A1 | 9/1995 |
| JP | 7-254037 | 10/1995 |

(Continued)

OTHER PUBLICATIONS

European Search Report issued Dec. 23, 2010 in corresponding European Patent Application 09179212.7.

(Continued)

*Primary Examiner* — Gregory M Desire
(74) *Attorney, Agent, or Firm* — Staas & Halsey LLP

(57) ABSTRACT

A marker attaching apparatus attaches to an image a positioning marker for detecting a specific area in the image, and includes: an area size detection unit detecting a size of an area to which the positioning marker is attached; a marker adjustment unit adjusting the positioning marker depending on the detected size of the area; and a marker attaching unit attaching the adjusted positioning marker to the image.

18 Claims, 21 Drawing Sheets

(56) References Cited

U.S. PATENT DOCUMENTS

2010/0158383 A1* 6/2010 Kuraki et al. .......... 382/190

FOREIGN PATENT DOCUMENTS

| | | |
|---|---|---|
| JP | 2008-301044 | 12/2008 |
| JP | 2009-232233 | 10/2009 |
| WO | 2008/053545 A1 | 5/2008 |
| WO | 2008/053576 A1 | 5/2008 |

OTHER PUBLICATIONS

Japanese Office Action mailed May 15, 2012 issued in corresponding Japanese Patent Application No. 2008-322378.

Xu Liu et al., "A Novel 2D Marker Design and Application for Object Tracking and Event Detection" Dec. 1, 2008, Advances in Visual Computing, Springer Berlin Heidelberg, Berlin, Heidelberg, pp. 248-257.

* cited by examiner

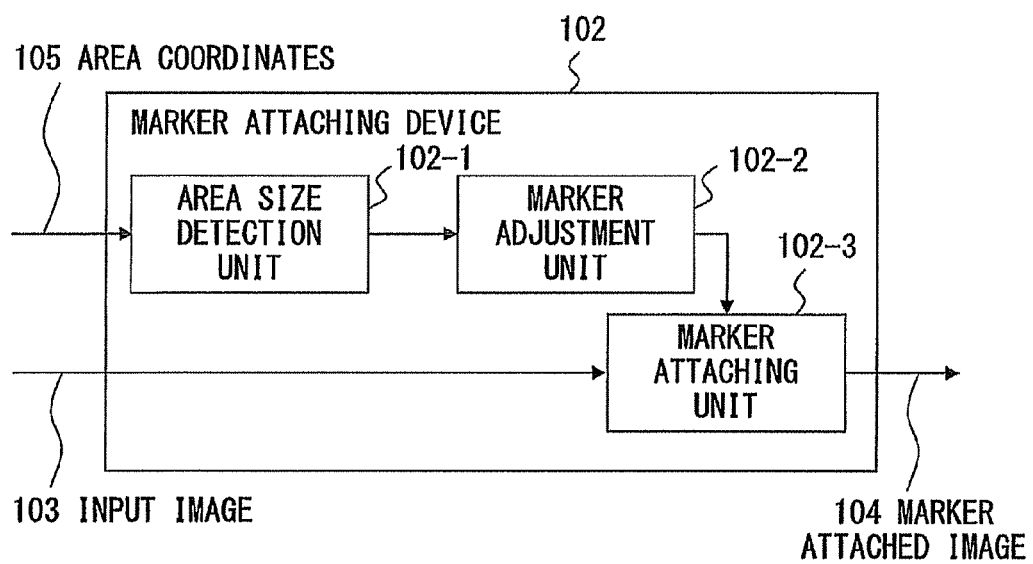
F I G. 1 B

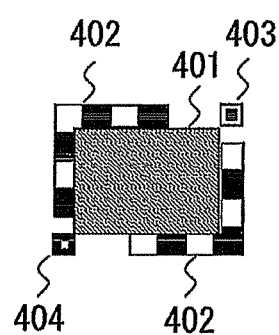
F I G. 4

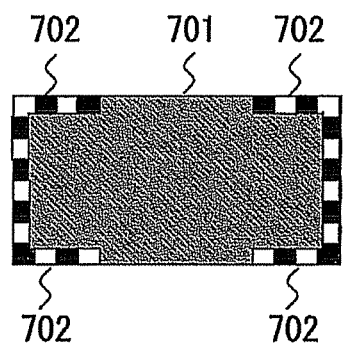
F I G. 7

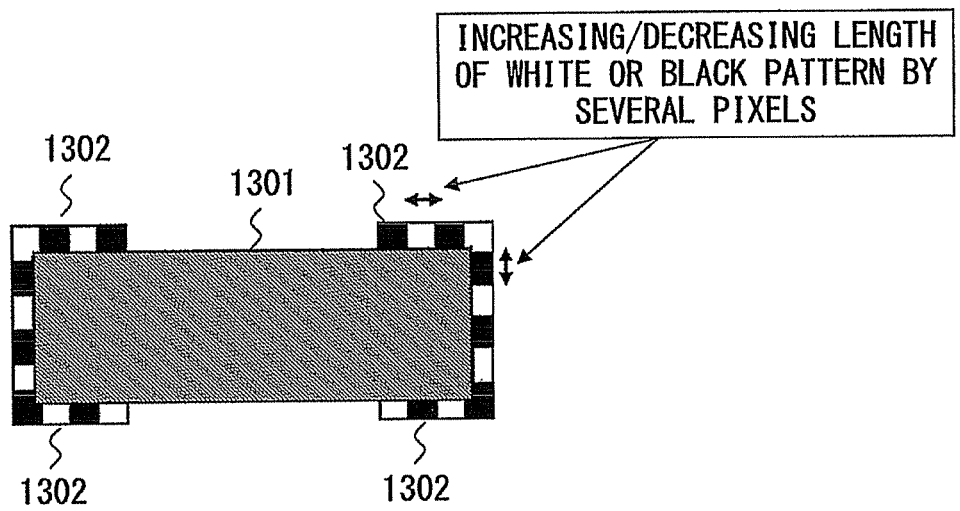
F I G. 1 3

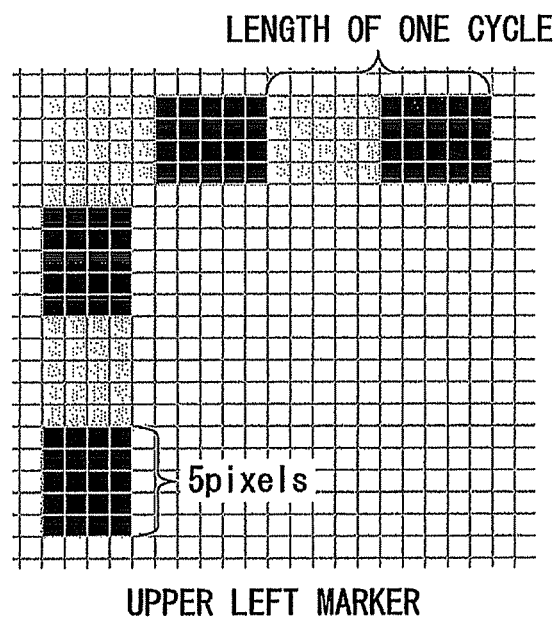
F I G. 1 5 A

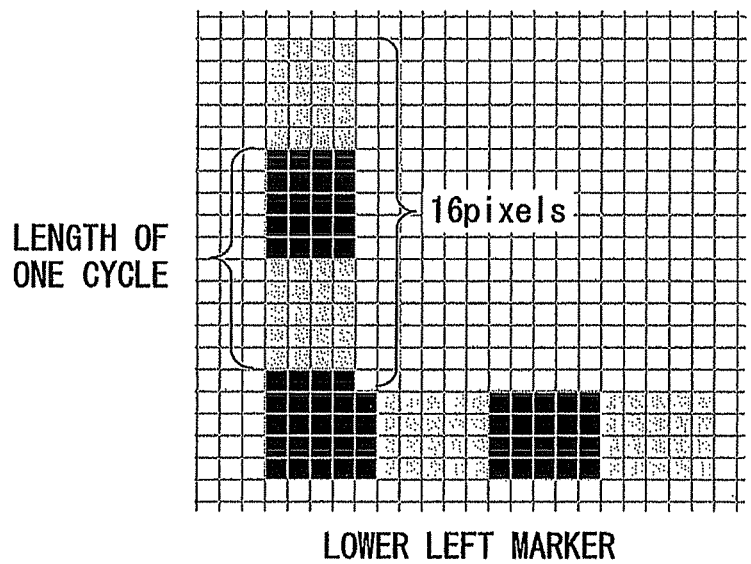
F I G. 1 5 B

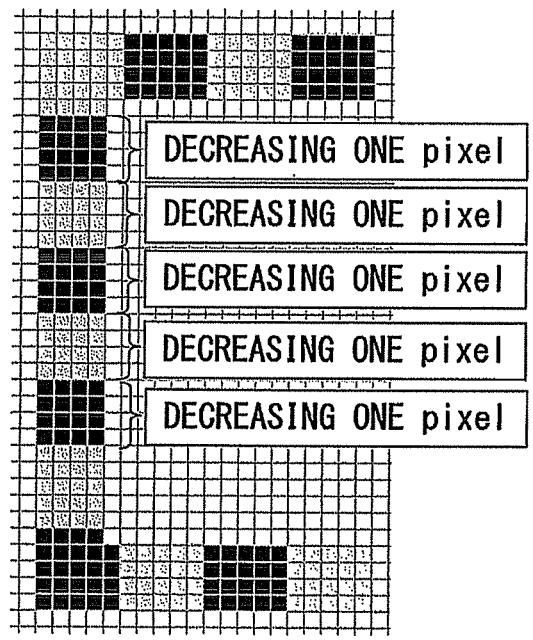
F I G. 17

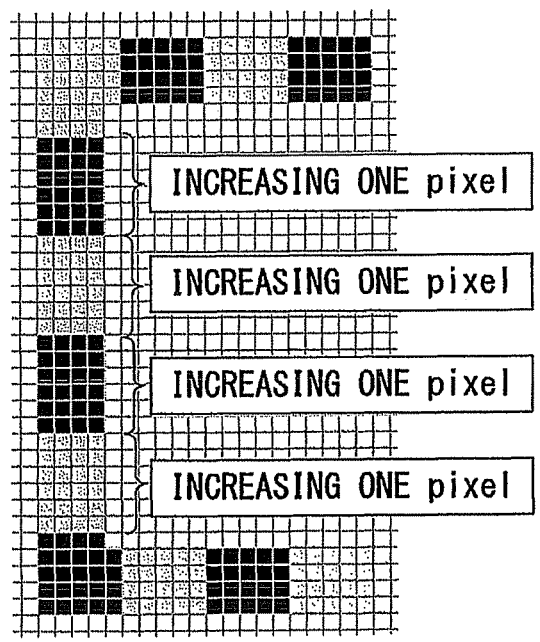
F I G. 1 8

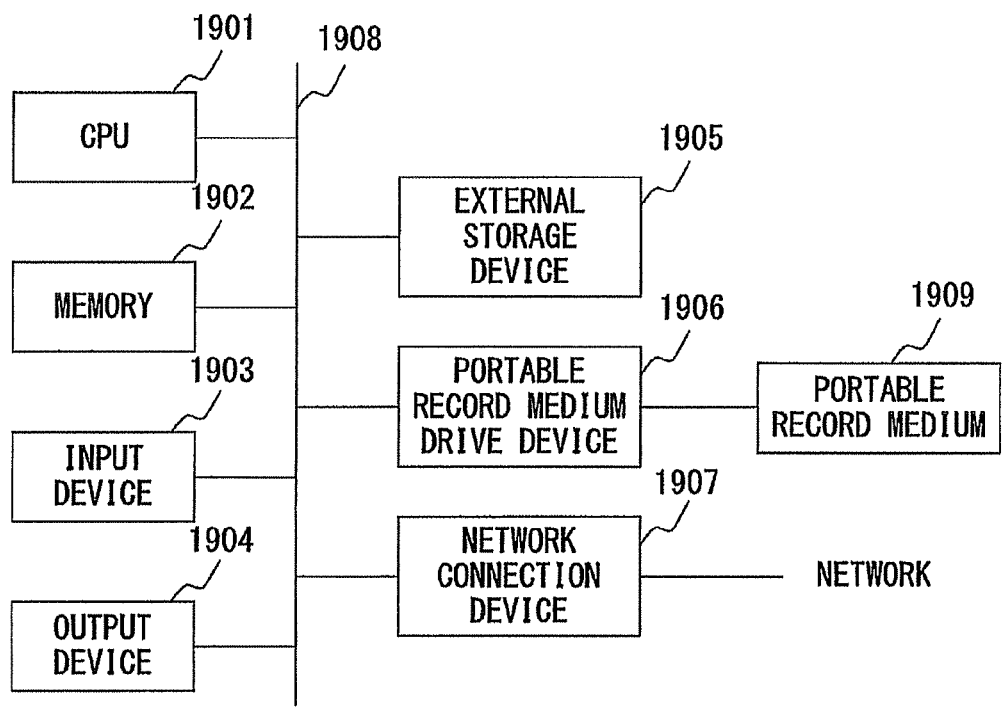
F I G. 19

IMAGE MARKER ATTACHING APPARATUS AND METHOD

CROSS-REFERENCE TO RELATED APPLICATIONS

This application is based upon and claims the benefit of priority of the prior Japanese Patent Application No. 2008-322378, filed on Dec. 18, 2008, the entire contents of which are incorporated herein by reference.

FIELD

The technology to be disclosed relates to a marker attaching technique for attaching to an image a positioning marker for detecting a specific area in an image printed on an analog medium such as paper etc. The technology can be used in, for example, indicating the position of an encrypted/coded area when a part of a printed image or a digital image is encrypted or coded to prevent information leakage.

BACKGROUND

In the growing computerization society, there is a serious problem of the leakage of confidential information, and the development of the technology for preventing information leakage is strongly demanded. For example, relating to digital data, the technology of encrypting data has been developed not reveal the contents of the data to the third parties although the data is received by the third parties, and has been utilized as effective means for preventing information leakage.

On the other hand, the effective technology of preventing information leakage of printed matter on paper media etc. has not been developed or commercialized. Practically, it is said that about half of the information leakage relates to printed matter, and the development of the technology for preventing the information leakage from printed matter as well as digital data is also demanded seriously. Practical examples of the demand for the measures against the information leakage from printed matter can relate to a bill issued when goods are purchased, a specification of a credit card etc., a medical record in hospital, a test record in school, books, etc.

In encrypting the data on printed matter, a marker recognition technology for identifying an encrypted part as well as an encrypting method is required.

As the first conventional technique relating to the encrypting technology and the marker recognition technology for printed matter, a two-dimensional code technique for representing binary data as an image and printing it on an analog medium is well known. Representing data as an image in this technique is realized by expressing binary data as white and black squares in a specified size and arranging the squares in matrix form. Furthermore, to indicate the position of the image in a decoding operation, a positioning marker is attached to printed matter at the position specified in the matrix. On the basis of the positioning marker, the image is captured by a scanner, a camera, etc., and embedded information can be decoded.

As the second conventional technique relating to the marker recognition technology, a marker indicating the position of an encrypted area is arranged at the periphery of the area. As with the case of the two-dimensional code, the coordinates of an encrypted area can be obtained by a reader detecting the marker arranged at the encrypted area, thereby performing the decoding process.

When an encrypted image is decoded, it is necessary to recover the positioning marker attached at the periphery of the encrypted area to the data before the marker is attached. As the third conventional technique relating to the process, there is the technology of recovering the marker at the periphery to the state before attaching the marker by the interpolating process using the value of the pixel adjacent to the information and the marker embedded in the header of an image file.

Relating to each of the above-mentioned techniques, the following patent documents are disclosed.

Patent Document 1: Japanese Patent No. 2938338
Patent Document 2: Japanese Laid-open Patent Application No. 2008-301044
Patent Document 3: Japanese Laid-open Patent Application No. 2009-232233

In each of the above-mentioned conventional techniques, there occurs a problem when an area to be encrypted is small when, for example, only one line of sentence described by small characters, only one cell in a table is to be encrypted, etc.

Since the amount of information to be embedded for each unit area is limited in the above-mentioned first technique, the technique cannot be applied.

There has been the problem that the markers cannot be detected because the markers arranged at the peripheries of areas overlap each other in the above-mentioned second and third technique.

SUMMARY

The technology to be disclosed is based on the marker attaching apparatus for attaching to an image a positioning marker for detecting a specific area in the image.

An area size detection unit detects the size of an area to which a positioning marker is attached.

A marker adjustment unit adjusts a positioning marker depending on the detected size of the area.

A marker attaching unit attaches an adjusted positioning marker to an image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A and 1B illustrate the configurations of an embodiment of the present invention;
FIG. 4 is an example of using a small positioning marker;
FIG. 7 is an example (2) of attaching a positioning marker.

FIG. 13 is an explanatory view of the process of combining markers without destroying the characteristic of a marker;

FIGS. 15A and 15B are examples of positioning markers having a cyclic characteristic;

FIG. 17 is an explanatory view (1) of the process of combining markers without destroying the cyclicity;

FIG. 18 is an explanatory view (2) of the process of combining markers without destroying the cyclicity; and FIG. 19 illustrates the hardware for realizing an embodiment of the present invention.

DESCRIPTION OF EMBODIMENTS

The embodiment of the present invention is described below in detail with reference to the attached drawings.

FIG. 1 illustrates the configuration of an embodiment of the present invention.

Figure 1A:
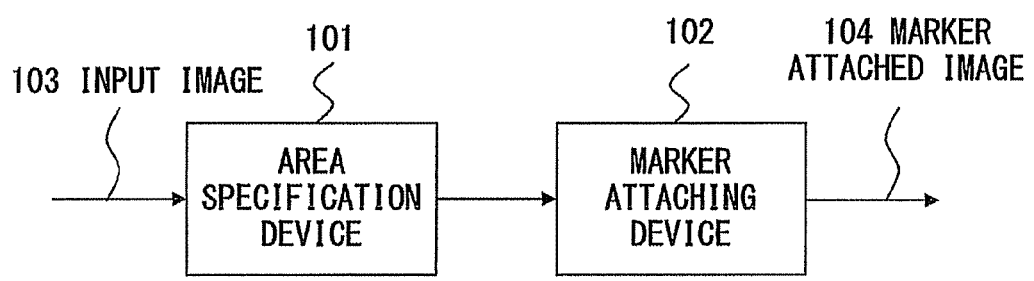

As illustrated in FIG. 1A, a positioning marker depending on the size of an area (for example, an encrypted area) specified by an area specification device 101 is attached by a marker attaching apparatus 102.

As illustrated in FIG. 1B, an input image 103 provided with a positioning marker and an area coordinates 105 indicating the coordinates of the area provided with the positioning marker are input to the marker attaching apparatus 102.

The area size detection unit 102-1 detects an area size from the specified area coordinates 105. Practically, the area size detection unit 102-1 calculates the height and the width of the area from the coordinates of the four corners indicated by the area coordinates 105. Otherwise, the area size detection unit 102-1 can calculate the length of a diagonal line and an area.

A marker adjustment unit 102-2 adjusts the positioning marker attached to the periphery of an area on the basis of the input area coordinates 105.

Described below is the first embodiment of the operation of the marker adjustment unit 102-2 illustrated in FIG. 1B.

Figure 3:
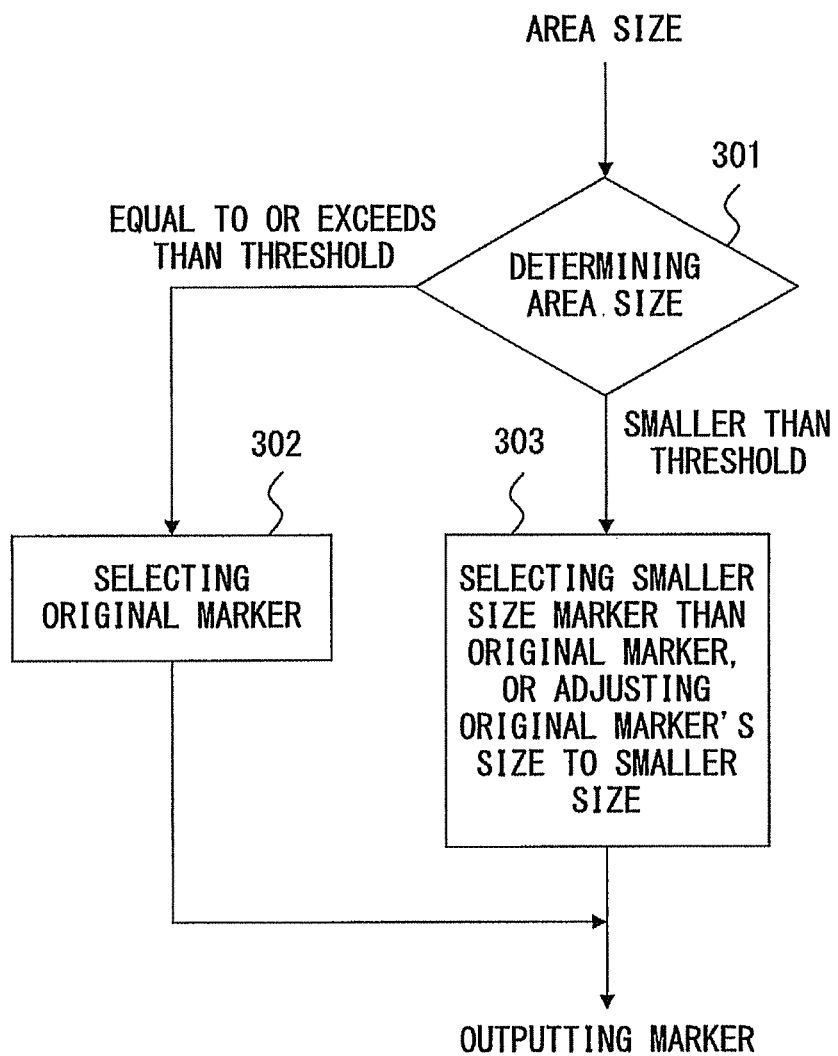
FIG. 3 is a flowchart of an operation according to the first embodiment of a marker adjustment unit.

FIG. 3 is a flowchart of an operation according to the first embodiment of a marker adjustment unit 102-2.

The area size detected by the area size detection unit 102-1 illustrated in FIG. 1B is input to the marker adjustment unit 102-2.

The marker adjustment unit 102-2 determines the area size (step S301 in FIG. 3).

If the area size is equal to or exceeds a predetermined threshold, the marker adjustment unit 102-2 selects the original positioning marker (steps S301→S302 in FIG. 3), and outputs the marker.

If the area size is smaller than the threshold, the marker adjustment unit 102-2 selects a positioning marker of a size smaller than the original. Otherwise, the marker adjustment unit 102-2 adjusts the size of the original positioning marker for a smaller marker (steps S301→S303 in FIG. 3). The marker adjustment unit 102-2 outputs the adjusted positioning marker.

Figure 2:
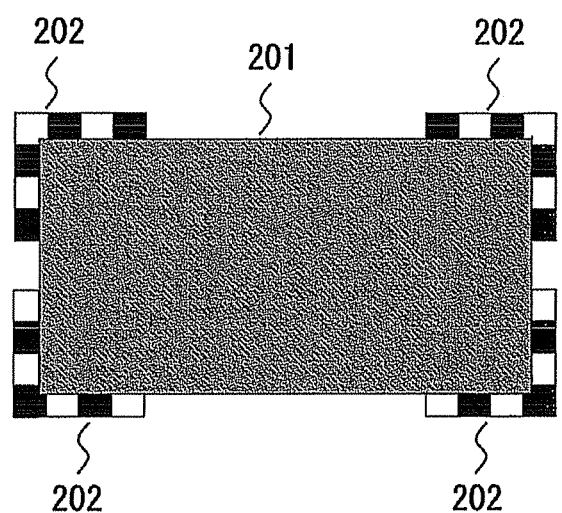
FIG. 2 is an example of a positioning marker.

For example, as illustrated in FIG. 2, if a positioning marker 202 is attached to an area 201, and the size of the area 201 allows the positioning marker 202 to be attached to the four corners without overlapping, then the marker adjustment unit 102-2 adopts the positioning marker 202 as is illustrated the FIG. 2 (S301→S302).

If the area is so small that the positioning markers overlap one another, the marker adjustment unit 102-2 uses the original positioning markers 302 and small positioning markers 303 and 304 for a small area 301 as illustrated in FIG. 4.

Figure 5:
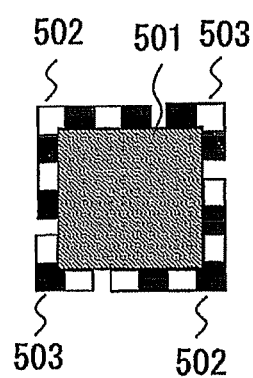
FIG. 5 is an example of reducing a part of a positioning marker into a smaller marker.

Otherwise, the marker adjustment unit 102-2 uses the original positioning markers 402 and positioning markers 403 obtained by reducing the original positioning markers 402 for a small area 401 as illustrated in FIG. 5 (S301→S303).

The marker adjustment unit 102-2 can also store in advance positioning markers in various sizes, and select a marker in an appropriate direction from among the stored makers.

Figure 6:
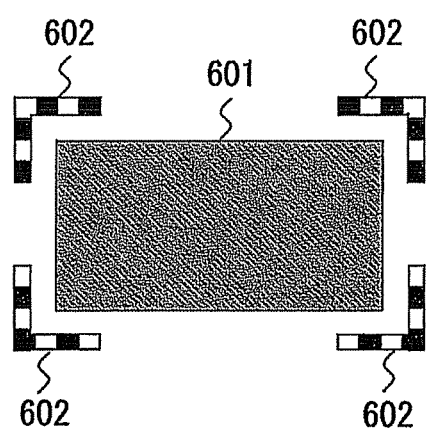
FIG. 6 is an example (1) of attaching a positioning marker.

In FIG. 1B, a marker attaching unit 102-3 attaches the positioning marker adjusted by the marker adjustment unit 102-2 to the periphery of the area specified by the area specification device 101 illustrated in FIG. 1A. The positioning marker is attached as adjacent to the area 201 as illustrated as the positioning marker 202 in FIG. 2. Otherwise, as illustrated as a marker 602 in FIG. 6, the marker can be attached apart from an area 601. Otherwise, as illustrated as a marker 702 in FIG. 7, it can be attached inside an area 701.

As described above, by the operation according to the first embodiment of the marker adjustment unit 102-2 illustrated in FIG. 1B, the area to which a positioning marker is to be attached can be smaller, and an appropriate marker can be attached by switching the shape of a positioning marker even to an area to which a marker cannot be attached in the conventional technology.

The second embodiment of the operation of the marker adjustment unit 102-2 illustrated in FIG. 1B is described below.

Figure 8:
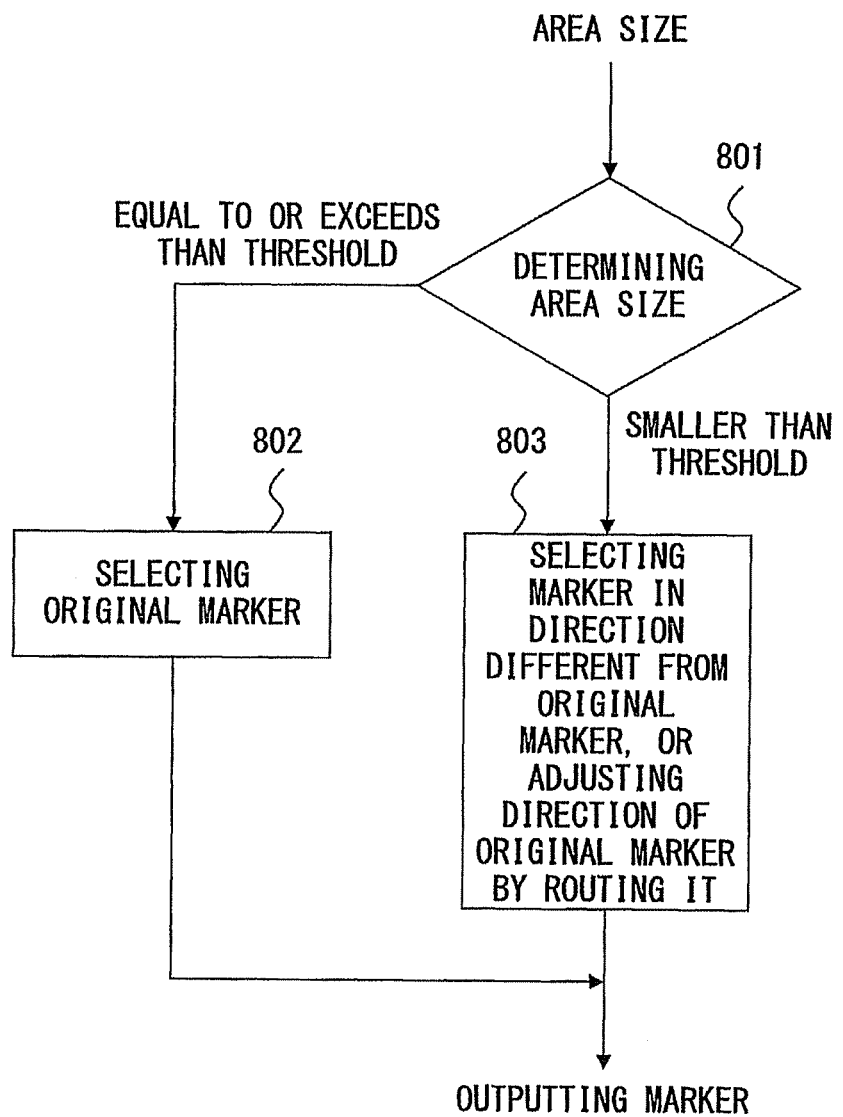
FIG. 8 is a flowchart of an operation according to the second embodiment of a marker adjustment unit.

FIG. 8 is a flowchart of an operation according to the second embodiment of the marker adjustment unit 102-2.

As in the case of the first embodiment illustrated in FIG. 3, the area size detected by the area size detection unit 102-1 illustrated in FIG. 1B is input to the marker adjustment unit 102-2.

The marker adjustment unit 102-2 determines the area size (step S801 in FIG. 8).

If the area size is equal to or exceeds a predetermined threshold, the marker adjustment unit 102-2 selects the original positioning marker (steps S801→S802 in FIG. 8), and outputs the marker. The operation in this case is the same as the operation in steps S301→S302 in the case of the first embodiment illustrated in FIG. 3.

On the other hand, if the area size is smaller than the threshold, the marker adjustment unit 102-2 selects the positioning marker in the direction different from the original. Otherwise, the marker adjustment unit 102-2 adjusts the direction of the original positioning marker by rotating it (steps S801→S803 in FIG. 8). The marker adjustment unit 102-2 outputs the adjusted positioning marker.

In the second embodiment, when the area is so small that the markers overlap one another, the marker adjustment unit 102-2 adjusts the directions of the markers so that they do not overlap one another.

Figure 9:
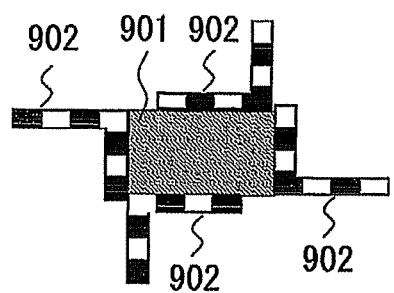
FIG. 9 is an example (1) of a positioning marker in a different direction.
Figure 10:
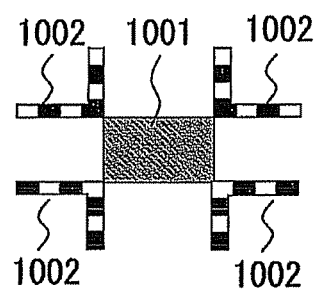
FIG. 10 is an example (2) of a positioning marker in a different direction.

That is, if the area is so small that the positioning markers overlap one another, the marker adjustment unit 102-2 selects a positioning marker 902 or 1002 whose normal direction can be changed on a small area 901 or 1001 as illustrated in FIG. 9 or 10.

The marker adjustment unit 102-2 stores in advance the positioning marker in various directions so that an appropriate marker can be selected from among the stored markers.

As described above, in the operation according to the second embodiment of the marker adjustment unit 102-2 illustrated in FIG. 1B, an appropriate marker can be attached by switching the directions of the positioning markers on a small area to which a positioning marker is to be attached but cannot be attached in the conventional technology. In this case, the detection precision of the positioning markers is not degraded although the sizes of the positioning markers are the same, and only the directions are different.

Described below is the third embodiment of the operation of the marker adjustment unit 102-2 in FIG. 1B.

Figure 11:
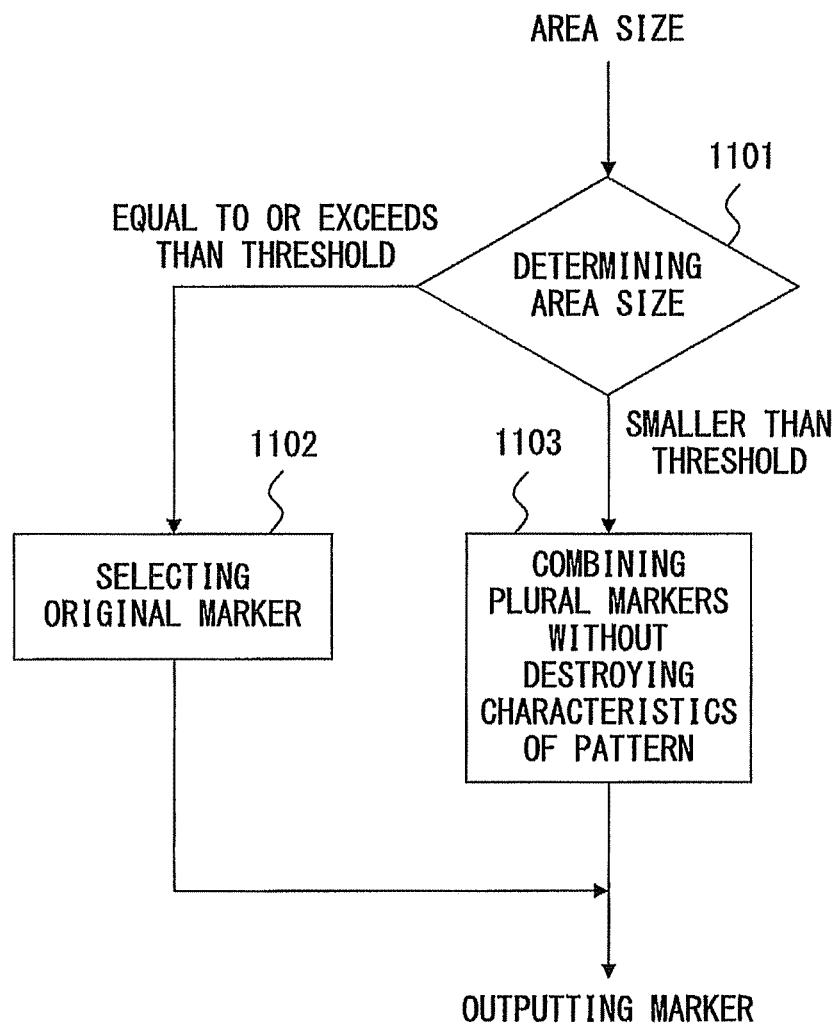
FIG. 11 is a flowchart of an operation according to the third embodiment of a marker adjustment unit.

FIG. 11 is a flowchart of an operation according to the third embodiment of a marker adjustment unit 102-2.

As in the case according to the first or second embodiment described above with reference to FIG. 3 or 8, an area size detected by the area size detection unit 102-1 illustrated in FIG. 1B is input to the marker adjustment unit 102-2.

The marker adjustment unit 102-2 determines the area size (step S1101 in FIG. 11).

If the area size is equal to or exceeds a predetermined threshold, the marker adjustment unit 102-2 selects the original positioning marker (steps S1101→S1102 in FIG. 11), and outputs the marker. The operation in this case is the same as the operation in steps S301→S302 in FIG. 3 or S801→S802 in FIG. 8 in the case of the first or second embodiment.

On the other hand, if the area size is smaller than the threshold, the marker adjustment unit 102-2 combines the positioning markers so that the characteristics cannot be destroyed, thereby generating a new positioning marker (steps S1101→S1103 in FIG. 11).

Figure 12:
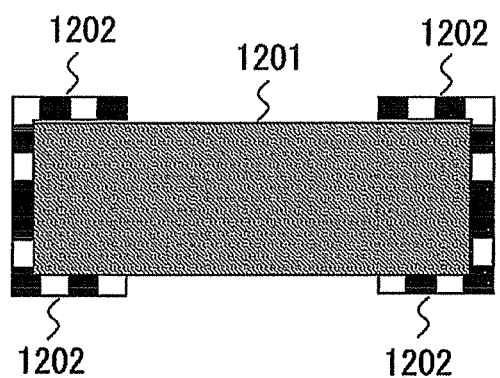
FIG. 12 is an explanatory view of destroying the characteristic of a marker.

As illustrated in FIG. 12 for example, when a plurality of positioning markers 1202 are simply overlapped, the characteristics of the patterns of the markers (frequency characteristic etc.) are destroyed, and an area 1201 cannot be detected in a decoding device. The marker adjustment unit 102-2 adjusts the pattern of markers as illustrated in FIG. 13, combines two or more positioning markers 1302 so that the characteristics of the pattern of the markers cannot be destroyed, and generates a marker to be attached to an area 1301. To be more practical, white and black patterns is increased and decreased in several pixels between adjacent positioning markers.

Figure 14:
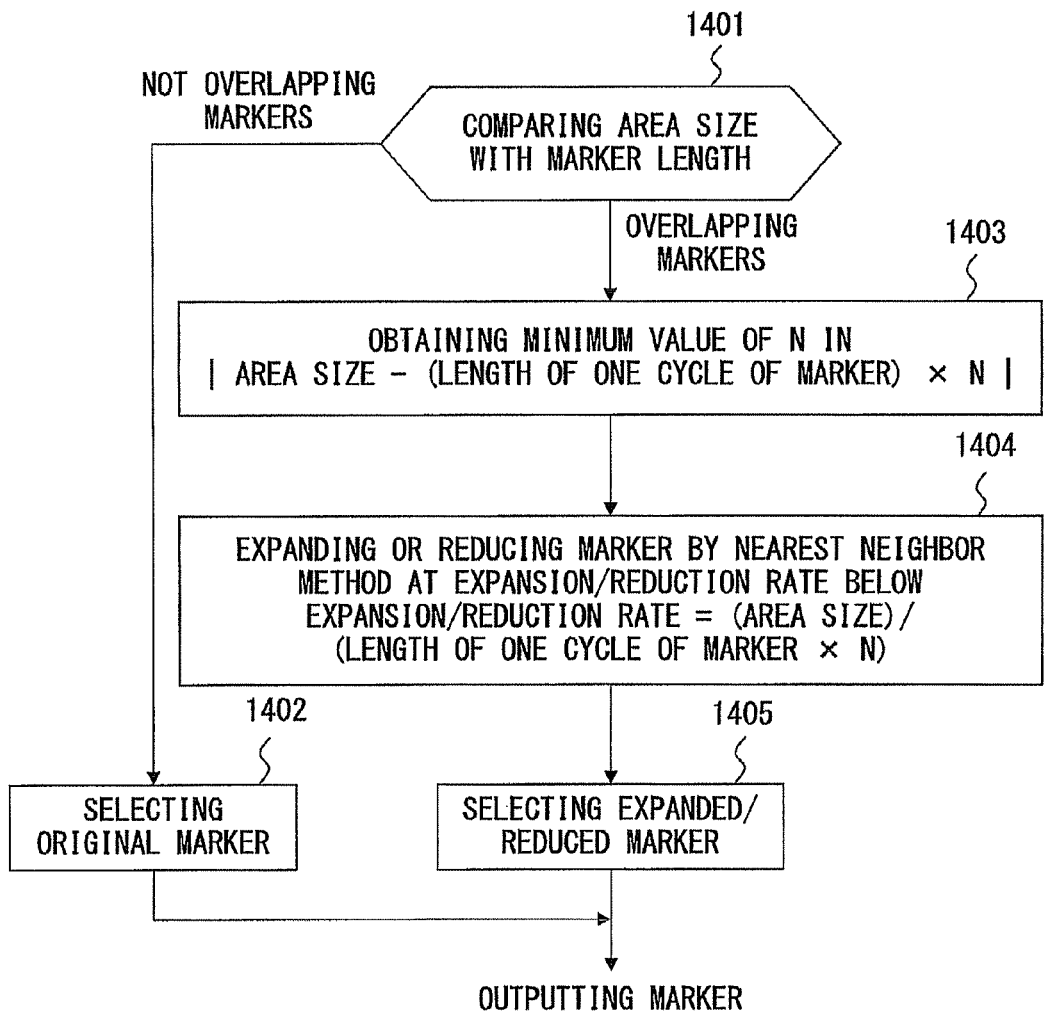
FIG. 14 is a flowchart of a further detailed operation according to the third embodiment of a marker adjustment unit.

FIG. 14 is a flowchart of a further detailed operation according to the third embodiment of the marker adjustment unit 102-2.

The marker adjustment unit 102-2 compares the area size input from the area size detection unit 102-1 in FIG. 1B with the length of the positioning marker (step S1401 in FIG. 14).

As a result, if the marks of the positioning markers do not overlap one another, the marker adjustment unit 102-2 selects the original positioning marker (steps S1401→S1402 in FIG. 14), and outputs the marker.

On the other hand, if the marks of the positioning marker overlap one another, the marker adjustment unit 102-2 performs the processes in steps S1403 and S1405 in FIG. 14. The processes are described below in detail.

A positioning marker has a cyclic pattern as illustrated in FIG. 15 for example. In detecting a marker in a decoding device, the cyclic characteristic is extracted using a frequency analysis such as a Fourier transform etc., the position of a marker is designated on the basis of the extraction result, and an area can be detected. Therefore, if the cyclic characteristic is destroyed, the marker cannot be detected.

As illustrated in FIG. 15 for example, if the width of one pattern realizing a positioning marker is represented by 5 pixels, then the cyclicity of the pattern realized by the marker is referred to as 10-pixel cyclicity. One side of the marker is formed by 16 pixels.

Figure 16:
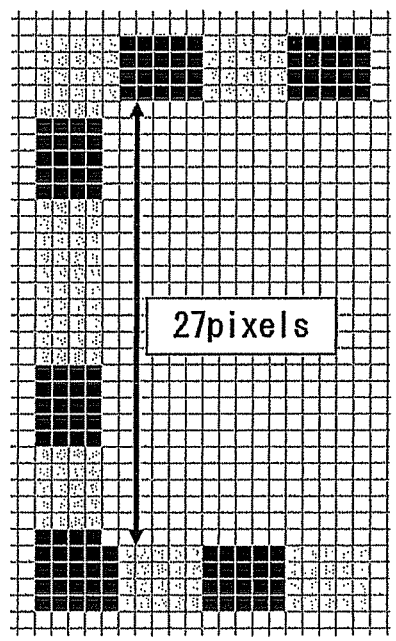
FIG. 16 illustrates simply overlapping positioning markers.

Under the conditions, if the positioning markers are attached to contact the outside of the four corners of the area as illustrated in FIG. 2, and the length of one side of the area to which the markers are attached is less than 32 pixels, then the two markers overlap each other. Described below is the case in which, for example, markers are attached to the area having the width of 27 pixels. If the marker in FIG. 15B is attached as overlapping to the lower left corner in the area having the width after the marker in FIG. 15A is attached to the upper left corner, then the markers overlap as illustrated in FIG. 16, and the cyclic characteristic of the pattern is destroyed.

As illustrated in FIGS. 17 and 18, the boundary portion of the pattern is increased and decreased by one through several pixels. That is, the phase and the wavelength are adjusted in the frequency analysis, but the cyclicity as a frequency characteristic can be maintained. When the position of a positioning marker is detected in the decoding device, the position is detected with the frequency characteristic analyzed in a certain extent of a range. Therefore, the detection precision is not degraded by the increase or decrease of one through several pixels.

The above-mentioned pixel increasing/decreasing process is performed in steps S1403 and S1404 in FIG. 14.

That is, the marker adjustment unit 102-2 in FIG. 1B first obtains a natural number N that derives the minimum value by the following equation (1) (step S1403 in FIG. 14).

$$|\text{area size} - (\text{length of one cycle of marker}) \times N| \quad (1)$$

where the area size is defined as a sum of the pixel size of the area itself and the pixel width of the positioning marker. In the example in FIG. 16, the width in the vertical direction of the area is 27 pixels, and the width of the upper and lower positioning markers attached to the left of the area is 4 pixels. Therefore, the area size is 27 pixels+4 pixels+4 pixels=35 pixels. In addition, the length of one cycle of the positioning marker is 10 pixels as described above. Therefore, by the equation (1) above, N=3 or 4 (optional).

Next, the marker adjustment unit 102-2 expands or reduces the positioning marker by nearest neighbor method at the expansion/reduction rate calculated by the equation (2) below (step S1404 in FIG. 14)

$$\text{Expansion/reduction rate} = (\text{area size})/(\text{length of one cycle of marker}) \times N \quad (2)$$

When N=4 in the example above, expansion/reduction rate=35/(10×4)=35/40 (reduction). As a result, for example, the 5-pixel patterns of the positioning markers in FIGS. 15A and 15B are reduced to patterns of 5 pixels×35/40≈4 pixels. That is, as illustrated in FIG. 17, the number of pixels of each pattern is decreased by one pixel.

On the other hand, when N=3 in the example above, expansion/reduction rate=35/(10×3)=35/30 (reduction). As a result, for example, the 5-pixel patterns of the positioning markers in FIGS. 15A and 15B are expanded to patterns of 5 pixels×35/30≈6 pixels. That is, as illustrated in FIG. 18, the number of pixels of each pattern is increased by one pixel.

The marker adjustment unit 102-2 selects the positioning marker expanded or reduced as described above (step S1405 in FIG. 14), and outputs the marker.

In the third embodiment, when the area is so small that markers overlap one another, the marker adjustment unit 102-2 can attaches a marker that does not degrade the detection precision by attaching a marker obtained by combining a plurality of markers.

FIG. 19 is an example of a configuration of hardware or a computer for realizing a system according to an embodiment illustrated in FIGS. 1A and 1B.

The computer illustrated in FIG. 19 includes a CPU 1901, memory 1902, an input device 1903, an output device 1904, an external storage device 1905, a portable record medium drive device 1906 into which a portable record medium 1909 is inserted, and a network connection device 1907. These components are connected to one another via a bus 1908. The configuration illustrated in FIG. 19 is an example of a computer capable of realizing the system above, and the computer is not limited to the configuration.

The CPU 1901 controls the entire computer. The memory 1902 such as RAM etc. temporarily stores the program or data stored in the external storage device 1905 (or the portable record medium 1909) when the program is executed, the data is updated, etc. The CPU 1901 controls the entire computer by reading the program to the memory 1902 and executes it.

The input device 1903 can be, for example, a keyboard, a mouse, etc. and their interface control device. The input device 1903 detects an inputting operation by a keyboard, a mouse, etc. by a user, and notifies the CPU 1901 of the detection result.

The output device 1904 can be a display device, a printing device, etc. and their interface control device. The output device 1904 outputs data transmitted by the control of the CPU 1901 to a display device and a printing device.

The external storage device 1905 is, for example, a hard disk storage device, and mainly used in storing various data and programs.

The portable record medium drive device 1906 accommodates the portable record medium 1909 such as an optical disk, SDRAM, CompactFlash, etc., and has a role auxiliary to the external storage device 1905.

The network connection device 1907 connects a communication circuit of, for example, a LAN (local area network) or a WAN (wide area network).

The system according to the embodiments is realized by executing the program having a necessary function by the CPU 1901. The program can be distributed after recorded on the external storage device 1905 and the portable record medium 1909, or can be acquired over a network by the network connection device 1907.

According to the disclosed technology, when the size of a specified area is large, a positioning marker is attached to a specific position in an image in a normal system. When the size of the specified area is small, a marker of a size, direction, and pattern can be attached depending on the size of an area.

Thus, a positioning marker can be attached to a small area by adjusting the characteristic of a marker by the size of an area.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A marker attaching apparatus for attaching to an image a positioning marker for detecting a specific area in the image, comprising:

an area size detection unit to detect a size of an area to which the positioning marker is attached;

a marker adjustment unit to adjust a size or a shape of the positioning marker depending on the detected size of the area and when the size of the of the detected area is smaller than a threshold, generating a new positioning marker by coupling two or more positioning markers to maintain a frequency characteristic of the coupled positioning markers; and a marker attaching unit to attach the adjusted positioning marker to the image.

2. The marker attaching apparatus according to claim 1, wherein the marker adjustment unit switches a pattern of the positioning marker depending on the detected size of the area.

3. The marker attaching apparatus according to claim 1, wherein the marker adjustment unit adjusts a size of the positioning marker depending on the detected size of the area.

4. The marker attaching apparatus according to claim 1, wherein the marker adjustment unit adjusts a direction of the positioning marker depending on the detected size of the area.

5. The marker attaching apparatus according to claim 1, wherein the marker adjustment unit combines a plurality of positioning markers depending on the detected size of the area.

6. The marker attaching apparatus according to claim 1, wherein the marker adjustment unit adjusts the positioning marker while maintaining a frequency characteristic of the positioning marker.

7. A marker attaching method conducted by a marker attaching apparatus for attaching to an image a positioning marker for detecting a specific area in the image, comprising:

an area size detecting step to detect a size of an area to which the positioning marker is attached;

a marker adjusting step to adjust a size or a shape of the positioning marker depending on the detected size of the area and when the size of the of the detected area is smaller than a threshold, generating a new positioning marker by coupling two or more positioning markers to maintain a frequency characteristic of the coupled positioning markers; and a marker attaching step to attach the adjusted positioning marker to the image printed on an analog medium.

8. The marker attaching method according to claim 7, wherein the marker adjusting step switches a pattern of the positioning marker depending on the detected size of the area.

9. The marker attaching method according to claim 7, wherein the marker adjusting step adjusts a size of the positioning marker depending on the detected size of the area.

10. The marker attaching method according to claim 7, wherein the marker adjusting step adjusts a direction of the positioning marker depending on the detected size of the area.

11. The marker attaching method according to claim 7, wherein the marker adjusting step combines a plurality of positioning markers depending on the detected size of the area.

12. The marker attaching method according to claim 7, wherein
the marker adjusting step adjusts the positioning marker while maintaining a frequency characteristic of the positioning marker.

13. A computer-readable non-transitory tangible record medium storing a program used to direct a computer as a marker attaching apparatus to attach to an image a positioning marker for detecting a specific area in the image, comprising:
an area size detecting step to detect a size of an area to which the positioning marker is attached;
a marker adjusting step to adjust a size or a shape of the positioning marker depending on the detected size of the area and when the size of the of the detected area is smaller than a threshold, generating a new positioning marker by coupling two or more positioning markers to maintain a frequency characteristic of the coupled positioning markers; and
a marker attaching step to attach the adjusted positioning marker to the image.

14. The record medium according to claim 13, wherein the marker adjusting step switches a pattern of the positioning marker depending on the detected size of the area.

15. The record medium according to claim 13, wherein the marker adjusting step adjusts a size of the positioning marker depending on the detected size of the area.

16. The record medium according to claim 13, wherein the marker adjusting step adjusts a direction of the positioning marker depending on the detected size of the area.

17. The record medium according to claim 13, wherein the marker adjusting step combines a plurality of positioning markers depending on the detected size of the area.

18. The record medium according to claim 13, wherein the marker adjusting step adjusts the positioning marker while maintaining a frequency characteristic of the positioning marker.

* * * * *

UNITED STATES PATENT AND TRADEMARK OFFICE
CERTIFICATE OF CORRECTION

PATENT NO. : 8,532,433 B2
APPLICATION NO. : 12/637256
DATED : September 10, 2013
INVENTOR(S) : Kensuke Kuraki et al.

It is certified that error appears in the above-identified patent and that said Letters Patent is hereby corrected as shown below:

In the Claims

Column 7, Line 67, In Claim 1, after "size" delete "of the".
Column 8, Line 41, In Claim 7, after "size" delete "of the".
Column 9, Line 14, In Claim 13, after "size" delete "of the".

Signed and Sealed this
Twenty-fourth Day of December, 2013

Margaret A. Focarino
*Commissioner for Patents of the United States Patent and Trademark Office*